United States Patent [19]

Clissett et al.

[11] Patent Number: 4,955,252
[45] Date of Patent: Sep. 11, 1990

[54] CABLE-AND-SLEEVE CONNECTIONS

[75] Inventors: Peter A. G. Clissett, Stourport-on-Severn; Roger A. Lacey, Shrawley, both of Great Britain

[73] Assignee: Acco Cable Controls Limited, Worcestershire, United Kingdom

[21] Appl. No.: 896,953

[22] Filed: Aug. 15, 1986

[30] Foreign Application Priority Data

Aug. 16, 1985 [GB] United Kingdom ............... 8520612

[51] Int. Cl.⁵ ................................................ F16C 1/10
[52] U.S. Cl. .............................. 74/502.4; 74/501.5 R
[58] Field of Search ............ 74/501.5 R, 500.5, 502.4; 192/111 A; 188/196 R, 196 B

[56] References Cited

U.S. PATENT DOCUMENTS

| 3,605,520 | 9/1971 | Lorenz et al. | 74/501.5 R |
| 4,174,099 | 11/1979 | Yamasaki | 74/501.5 X |
| 4,274,300 | 6/1981 | Golobay | 74/501.5 R |
| 4,420,988 | 12/1983 | Deligny | 74/501.5 R |
| 4,464,950 | 8/1984 | Deligny | 74/501.5 R |
| 4,570,506 | 2/1986 | Yamamoto et al. | 74/501.5 R |

FOREIGN PATENT DOCUMENTS

| 120616 | 10/1984 | European Pat. Off. | 74/501.5 R |
| 48620 | 3/1986 | European Pat. Off. | |
| 57205261 | 12/1982 | Japan | 74/501.5 R |
| 2088502 | 6/1982 | United Kingdom | 74/501.5 R |

Primary Examiner—Rodney M. Lindsey
Attorney, Agent, or Firm—Shlesinger & Myers

[57] ABSTRACT

A cable-and-sleeve connector includes a compensator to which a part 11a the length of the sleeve is connected by a clutch 45, contained within the compensator, when the cable is under tension. The sleeve part 11a can be released from the clutch 45 by movement longitudinally of itself of an actuating member 35 when the tension in the cable 10 is released. Movement of the actuator 35 is effected by a striker 34 that is fixed to the cable 10 and can move out of the compensator, into the sleeve part 10b, as the tension is exerted on the cable.

5 Claims, 2 Drawing Sheets

CABLE-AND-SLEEVE CONNECTIONS

DESCRIPTION

This invention is concerned with cable-and-sleeve connectors such as are widely used, for example, in automobiles to connect the clutch or brake to an actuating member by which operation of the clutch or brake can be effected. Such connectors can easily be curved, to pass round corners, for instance, and need not be rigidly supported along their length, with the result that some deformability of the curve or curves is possible.

Now in manual shift systems of automobiles, the clutch facing plate wears during use resulting in the relatively heavy clutch spring drawing the cable further towards the clutch and effectively shortening the cable so that play will be introduced between clutch pedal and the cable. On the other hand in braking systems, the effective length of the cable is increased as brake shoes wear down which results in undersirable play being introduced into the brake system requiring a braking force is exerted.

Undersirable play can also be introduced into a cable-and-sleeve connector as a result of wear between the cable and the inner wall of the sleeve. In addition wear may occur between a cable and a sheave over which the cable extends and this may introduce undesirable play into a control cable system.

In European patent publication No. 0 048 620, there is described a cable-and-sleeve connector that incorporates a compensating device by which the effective length of the sleeve is automatically adjusted to compensate for changes in the effective length of the sleeve relative to that of the cable. This includes a clutch that automatically engages an end of the sleeve to hold it fixed when the cable is brought under tension but that releases the end of the sleeve when the tension is relaxed to enable the end to move to compensate for changes in the effective length of the sleeve relative to that of the cable.

In this prior proposal, the compensating device needs to be fixed, at a firewall, for instance, at one end of the sleeve. This limits the range of locations in which it can be used. Moreover, the compensating device is wholly confined within its own housing with a result that it tends to be of a length that again limits its versatility.

According to the present invention, there is provided a cable-and-sleeve connector in which the positions of the ends of the sleeve are fixed and the sleeve extends in a curved, deformable, path between its ends, the sleeve comprising two parts and a housing extending between the parts and by which the parts are connected together, the first part being connected to the housing by means of a clutch disposed within the housing and operable between a position in which it holds an end portion of the first part fixed relatively to the housing and a position in which the first part is released, the end portion of the first part then being free to reciprocate axially within the housing, resilient means acting on the clutch in a sense that urges the clutch into engagement with the sleeve, an actuating member extending around the cable within the housing on the side of the clutch remote from the first part of the sleeve and movable axially between an operative position in which it holds the clutch in the position in which the first part is released and an inoperative position in which it permits the clutch to hold the first part fixed, and a striker fixed to the cable such that, by reciprocation of the cable within the sleeve, the striker can move between a position in which it abuts the actuating member to hold it in its operative position and a position in which it lies withdrawn into the second part of the sleeve and permits the actuating member to move to its inoperative position.

Partly as a result of the fact that the striker can move outside the housing, the length of the rigid housing of the compensator can be less than is that of the earlier proposal; the length may be reduced by as much as half. Moreover the housing does not require a fixed support so that it can be included wherever may be convenient between the actuation member and the controlled member with which it is used.

By way of example, an embodiment of the invention will now be described with reference to the accompanying drawings in which.

Figure 1:
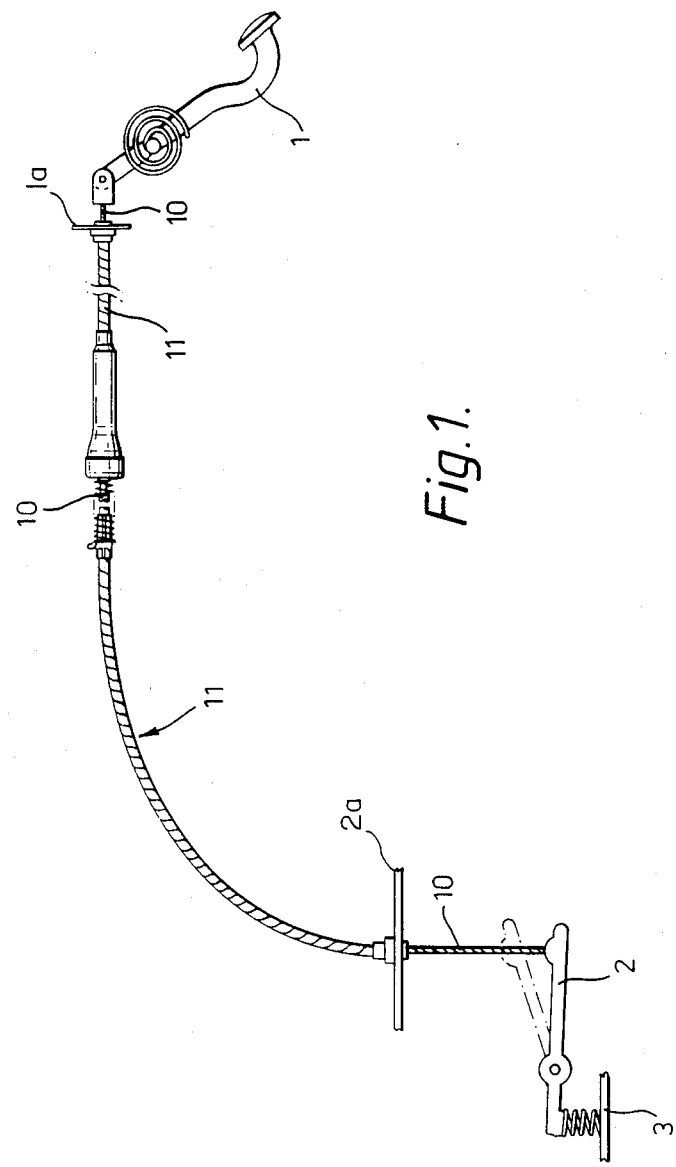
FIG. 1 shows a cable-and-sleeve connector extending between an automobile clutch and a clutch pedal.

In FIG. 1, an unbroken cable 10 extends between an end of a pedal lever 1 and an end of a clutch lever 2. With use, the clutch plates, indicated at 3, will tend to wear so that the effective length of the cable 10 will be reduced. Undesirable play will therefore be introduced unless the effective length of the sleeve, 11, is also reduced. By use of the compensator that essentially constitutes FIG. 2, the length of the sleeve 11 can effectively be reduced to compensate for the effective change in length of the cable 10.

The sleeve 11 is formed in three parts, 11a, 11b, and the part, 11c, that is constituted by the outer housing of the compensator. The housing 11c is of generally cylindrical form having a generally conical enlargement 13 flaring outwardly at one end towards the automobile clutch. The enlargement 13 is formed at one end of a cylindrical section 14 that fits tightly within a second cylindrical section 15 and is retained there by engagement of the bumps-and-recesses indicated at 16. The housing is formed by two sections to facilitate the inclusion in the housing of a mechanism that will be described later.

The part 11a of the sleeve is formed by closely, tightly and stiffly wound wire 20 contained, along most of its length, within a smooth sheath 21. The sheath 21 stops short of the housing 11c, leaving the exposed end of the winding 20 to project into the housing 11c. A flexible rubber cap 22 fits snugly over the flared enlargement 13 and snugly around the winding 20. The cap 22 serves to exclude dust from the housing 11c but the fit with the winding 20 is such as to permit the extent to which the winding 20 projects into the housing 11c to vary. At its end remote from the housing 11c, the sleeve 11a is fixed to a stationary bracket 2a spaced from the clutch lever 2.

The sleeve part 11b is also formed of a metal liner 30 lying inside a smooth sheath 31. An end of the sleeve part 11b is gripped within a rearward extension 32 of the housing 11c remote from the flared end. The other end of the sleeve part 11b is fixed to a stationary bracket 1a spaced from the pedal 1.

Figure 2:
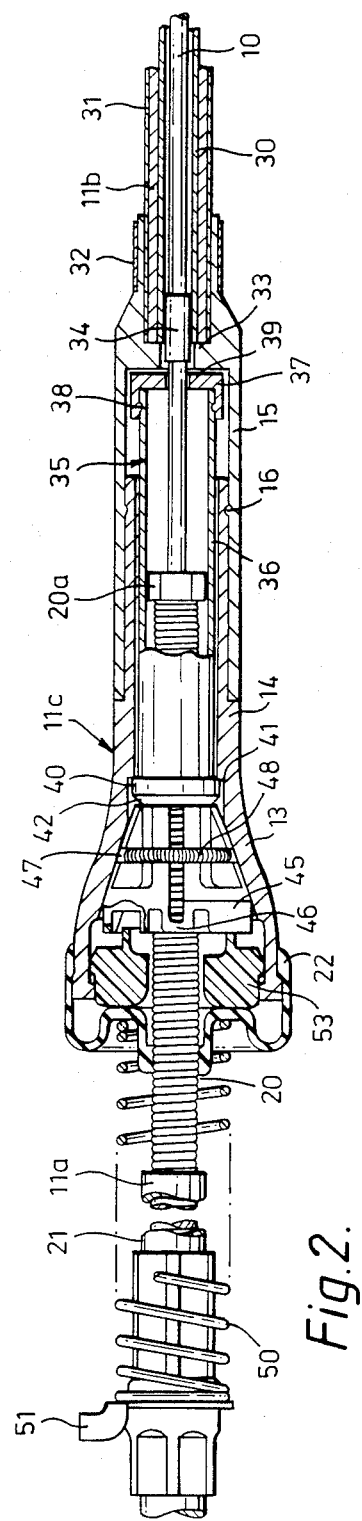
FIG. 2 shows a compensator included in the connector with the cable under tension.
Figure 3:
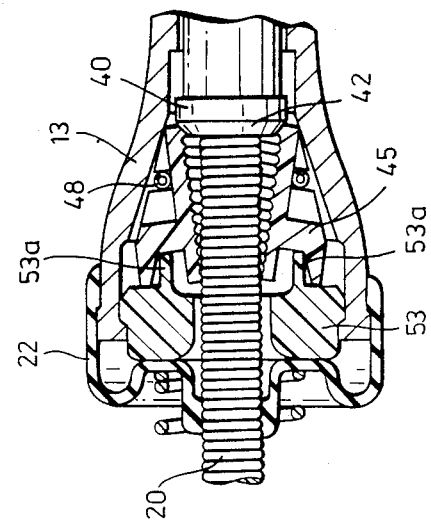
FIG. 3 shows a detail of FIG. 2 when the tension on the cable has been released.

The end of the sleeve part 11b that is received within the extension 32 abuts an inwardly projecting flange 33, the opening through which is of the same diameter as, and is aligned with, the passage through the sleeve part 11b. Fixed to, and around, the cable 10, in the region of the flange 33, is a striker 34, in the form of a boss embracing the cable 10. The diameter and location of the striker 34 is such that when the tension in the cable 10 is released, it will move with the cable from the position in which it is shown in FIG. 2, through the flange 33, and into the housing 11c to operate the mechanism that is contained in the housing. This mechanism will now be described.

The mechanism serves to hold the end of the winding 20 fixed when the cable 10 is under tension, so that the overall length of the sleeve 11 is fixed relatively to the cable 10 and to release the winding 20 when the tension is relaxed so that the overall length of the sleeve can adjust itself automatically, as a result of the curvature in the connector, to compensate for any change in the length of the cable 10 relatively to that of the sleeve 11.

The mechanism includes an actuating member 35 in the form of a cylinder 36 having a cap 37 held on to one end by means of the bumps-and-recesses 38. The cap 37 provides an inwardly projecting flange 39 that will be contacted by the striker 34 as the tension in the cable 10 is relaxed.

The winding 20 extends into the actuating member 35; after it has been introduced, a ring 20a is crimped on to the winding 20 to prevent its accidentally becoming separated.

At the other end, the cylinder 36 carries a head 40, the shoulder behind which abuts a ridge 41 on the inside of the cylinder section 14 to limit the movement of the actuating member 35 away from the enlargement 13. The end of the head 40 remote from the shoulder is chamfered at 42.

The mechanism also includes, next to the head 40, a unit that surrounds the winding 20 and provides four similar collet members 45 that are lightly held together at their wider ends by webs 46. In their operative positions in which they appear in FIG. 2, the collets 45 define an axially-extending opening in which the winding 20 fits closely and serrations 46 formed on the inner surfaces of the collet 45 engage with the ridges formed by the turns of the winding 20. The external surfaces of the collets 45 are generally conical and mate, in their operative position, with the conical internal surface of the enlargement 13 so that the collets 45 are kept in gripping engagement with the winding 20. An annular recess 47 is formed in and around the collets 45 and contains an annular helically wound spring 48 that exerts a small force acting to hold the collets 45 together.

Continually acting to urge the collets 45 towards mating engagement with the enlargement 13 is the helical compression spring 50 acting between the clip 51 that is crimped to, and around, the sleeve part 11a and the rubber cap 22. The force of the spring 50 is transmitted to the collets 45 through the block 53 that fits loosely, with some degree of axial movement, in the enlargement 13 and lies between the cap 22 and the collets 45.

Now suppose the tension in the cable 10 is removed. The striker 34 will be moved to the left by the force exerted by the relaxing of the clutch 3. The striker 34 will first contact the flange 39 and then, with further movement of the cable, push the actuating member 35 to the left. The head 40 will engage the narrower ends of the collets 45 and push them to the left against the action of the spring 50. When the mating engagement of the collets 45 with the internal surface of the enlargement 13 has been broken, so that the narrower ends of the collets can be splayed out, the tapered end 42 of the head 40 will enter into the narrower ends of the collets 45 (which are slightly chamfered to facilitate this) so that further movement of the collets 45 to the left against the action of the spring 50 will also enable the narrower ends of the collets 45 to be splayed even further apart against the action of the annular spring 48. Projections 53a on the block 53 that lie loosely in recesses 45a in the collets 45 will continually locate the unit in which the collets 45 are contained. The result is that the wider ends only of the collets 45 will tend to remain in light contact with the winding 20 but contact between the collets 45 and the winding 20 will otherwise be removed. Movement of the winding 20 relatively to the collets 45, to compensate for effective change in the length of the cable, will therefore be easy; only at the wider ends of the collets 45 is contact sustained; this will be too light seriously to impede movement of the collets relatively to the winding 20 but has been found to promote more immediate and accurate re-engagement of the collets 45 with the winding 20 when cable 10 is again brought under tension.

It will be realised that the compensator that has been described can fit at any convenient location in the connection between the clutch and the pedal and the fact that the stroker can be contained in the sleeve itself facilitates the limitation of the overall length of the compensation.

We claim:

1. A cable-and-sleeve connector in which a cable extends through a sleeve the ends of the sleeve lie at positions which are fixed and the sleeve extends in a curved deformable path between its ends, the sleeve comprising a housing and first and second parts that extend one from each end of and are connected together by said housing, said first part being fixed to the housing and said second part being connected at an end portion to the housing by means of a clutch disposed within the housing and operable between a position in which it holds the end portion of said second part fixed relatively to the housing and a position in which said second part is released, the end portion of said second part then being free to reciprocate axially within said housing, resilient means acting on the clutch to urge the clutch into engagement with the sleeve, an actuating member extending around the cable within the housing on the side of the clutch remote from the second part of the sleeve and movable axially between an operative position in which it holds the clutch in the position in which the second part is released and an inoperative position in which it permits the clutch to hold the second part fixed, and a striker fixed to the cable such that, by reciprocation of the cable within the sleeve, the striker can move between a position in which it abuts the actuating member to hold it in its operative position and a position in which it lies withdrawn into the first part of the sleeve and permits the actuating member to move to its inoperative position.

2. A connector as claimed in claim 1 in which a flexible cap closes that end of said housing from which said second part of the sleeve extends, said resilient means is a helical spring encircling said second part, one end of said spring abuts a stop fixed to said second part and the other end acts on the clutch through said flexible cap.

3. A connector as claimed in claim 1 in which said actuating member is a cylinder embracing the cable and having, at the end adjacent the striker, an inwardly projecting flange with which the striker engages in abutting said actuating member.

4. A connector as claimed in claim 3 in which the clutch is a plurality of collets which encircle the end portion of said second part of the sleeve, the outer surfaces of said collets converge away from said second part of the sleeve which provides a surface corresponding to the outer surface of the collets, the resilient means acts axially on the collets to urge them into such contact with that surface of the housing that they are forced into engaging contact with the end portions of the second part of the sleeve, the end of the cylinder remote from the flange is chamfered at its outer edge, when the cylinder is in its operative position it is in contact with the collets, and the inner edges of the ends of the collets that make contact with the cylinder are chamfered so that movement of the cylinder from its inoperative to its operative position first brings the cylinder into contact with the collets that first moves them axially towards the position in which the second part of the sleeve is released and then causes the narrow ends of the collets to be splayed outwardly.

5. A connector as claimed in claim 1 in which the clutch is a plurality of collets which encircle the end portion of said second part of the sleeve, the outer surfaces of the collets converge away from said second part of the sleeve, the housing provides a surface corresponding to the outer surfaces of said collets, and said resilient means acts axially on the collets to urge them into such contact with that surface of the housing that they are forced into engaging contact with the end portion of said second part of the sleeve.

* * * * *